United States Patent [19]

Zobel et al.

[11] Patent Number: 5,527,263
[45] Date of Patent: Jun. 18, 1996

[54] STEREO ENDOSCOPE

[75] Inventors: Jürgen Zobel, Stamford, Conn.; Manfred Boebel, Oetisheim, Germany

[73] Assignee: Richard Wolf GmbH, Knittlingen, Germany

[21] Appl. No.: 388,041

[22] Filed: Feb. 10, 1995

[30]   Foreign Application Priority Data

Feb. 12, 1994 [DE] Germany .............................. 9402336 U

[51] Int. Cl.$^6$ ...................................................... A61B 1/06
[52] U.S. Cl. ........................................... 600/166; 359/473
[58] Field of Search ................................. 600/166, 111; 359/376–378, 462, 466, 473, 477

[56]   References Cited

U.S. PATENT DOCUMENTS

| | | | |
|---|---|---|---|
| 2,406,526 | 8/1946 | Bennett et al. | 359/376 |
| 4,061,135 | 12/1977 | Widran . | |
| 4,568,970 | 2/1986 | Rockstead | 359/477 X |
| 5,385,138 | 1/1995 | Berry | 600/166 |

FOREIGN PATENT DOCUMENTS 3818104  12/1988  Germany .

*Primary Examiner*—Richard J. Apley
*Assistant Examiner*—John P. Leubecker
*Attorney, Agent, or Firm*—Panitch Schwarze Jacobs & Nadel

[57]   ABSTRACT

A stereo endoscope has a shaft containing two optical systems which extend through the shaft and are arranged in close proximity to each other and a housing on the proximal end of the shaft for containing an interior holding assembly for a stereo optical device which provides a stereo view into the optical systems. The stereo optical device has on each side a duplicate, mirror-image arrangement having a first deviating prism aligned coaxially with its the associated optical system, a second deviating prism which follows the first prism and again aligns the optical axis of the associated optical system parallel to the direction of observation, and a transparent protective element in the direction of observation. The holding assembly includes a first holding part, which extends transverse to the optical axis of the two optical systems of the endoscope shaft. This holding part which is preferably a hollow cylinder, has interior recesses in which are placed, one each, a first, fixed deviating prism and a second, adjustable deviating prism. The holding assembly also has two additional holding parts which are fastened to the first holding part in such a way that they can be rotatably adjusted around its longitudinal axis. These additional holding parts carry two fixed field apertures for the respective optical systems, and each of the field apertures is placed between its optical system and the first deviating prism assigned to it.

8 Claims, 2 Drawing Sheets

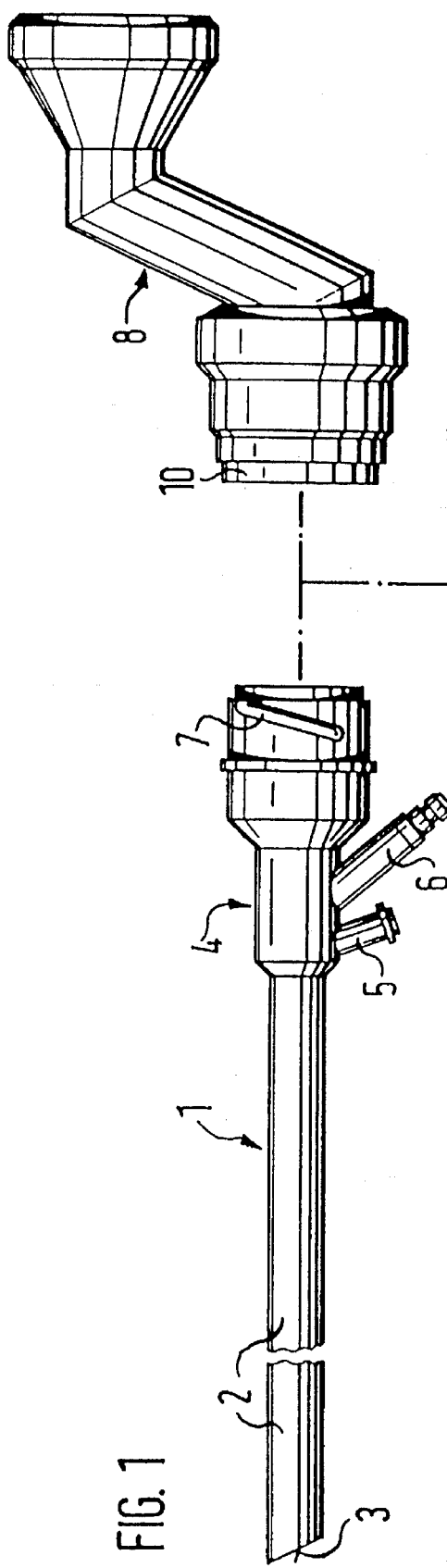
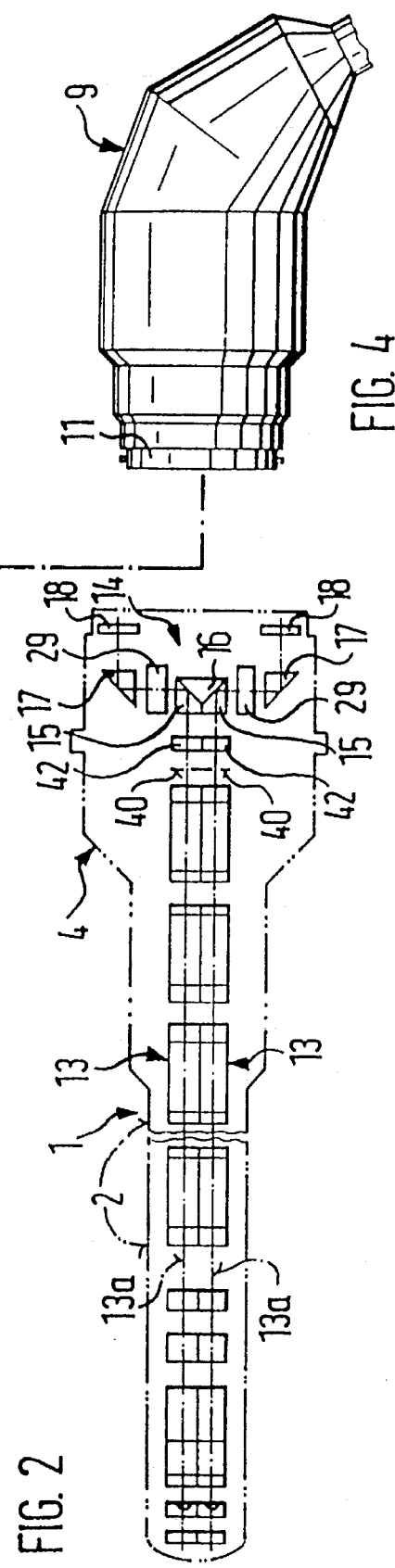

STEREO ENDOSCOPE

FIELD OF THE INVENTION

The invention relates to a stereo endoscope having two optical systems in close proximity to each other and extending through a shaft with a housing on the proximal end thereof and an inner holding assembly for a stereo optical device for a stereo view into the optical system. The stereo optical system has on each side in a duplicate, mirror-image arrangement, a first deviating prism aligned coaxially with the associated optical system, a second deviating prism following the first for again aligning the optical axis of the associated optical system parallel to the direction of observation, and a transparent protective element in the direction of observation.

BACKGROUND OF THE INVENTION

A stereo endoscope of this type is described in DE 38 18 104 A1. In this endoscope, to each optical system there is assigned on the proximal end a first deviating prism and a second deviating prism arranged after the first, whereby the second deviating prism realigns the optical axis so that it is again parallel to the direction of observation in the endoscope. The endoscope can be used for direct viewing and, by means of a control unit that can be connectable to it, in conjunction with a monitor. In addition, the endoscope is configured in such a way that a light source can be alternately connected to one optical system or the other of the endoscope shaft, so that in this event the endoscope can also be used for the mono manner of observation. It cannot be determined from this previously known endoscope if and how the deviating prisms can be adjusted.

In U.S. Pat. No. 4,061,135, a further endoscope for direct viewing is explained, in which deviating (dove) prisms are likewise arranged after each optical system of the endoscope shaft, to which prism eyepiece units can be attached in turn. The deviating prisms are mounted in a fixed manner in a holding assembly, which is in turn secured to a wall of a housing that holds the stereo optic system. In this case as well, it is not shown how an adjustment of the stereo optic system can be carried out.

SUMMARY OF THE INVENTION

An object of the invention consists of improving a 10 stereo endoscope of the type described at the outset, which, by means of compact construction, makes possible simple adjustment, particularly of the optical parts of the proximal stereo optical installation, provides an improved image transmission during observation in the endoscope, and is suitable for both direct viewing and observation by means of additional accessory instruments.

This object is achieved according to the present invention in which the holding assembly comprises a first holding part which extends transverse to the optical axis of the two optical systems of the endoscope shaft with inner recesses in which are placed, one each, a first fixed deviating prism and a second, adjustable deviating prism. Two additional holding parts are fastened to the first holding part in such a way that they can be adjusted in rotation around its longitudinal axis. The additional holding parts carry two fixed field apertures for the two-optical systems, each of the field apertures being placed between its optical system and the first deviating prism assigned to it.

According to the invention, a compact holding assembly is attained for the stereo optical equipment provided on the proximal end of the endoscope, which makes possible, in a simple way and under optical control, an adjustment of both the second deviating prism as well as the field apertures. The second deviating prisms can be adjusted in many degrees of freedom. As a result of this, the second deviating prisms can be optimally adjusted with respect to the first deviating prisms as well as in the endoscopic direction of observation. Independently of this, the field apertures can also be adjusted, particularly relative to the optical systems in the endoscope shaft, essentially within a plane that runs parallel to the observation entry surfaces of the aforementioned optical systems. For this purpose, the additional holding parts of the holding assembly, which carry the field apertures, can be displaced axially on the holding assembly's first, cylindrical holding part, as well as pivoted around this part and secured in place.

The field apertures make possible a nearly vignetting-free, and thus improved, image transmission. In addition to this, the adjustably designed stereo optical equipment can be built very compactly, so that the stereo endoscope, in accordance with the invention, can exhibit an interocular distance that is significantly smaller than the natural distance between the eyes, as a result of which recording cameras, for example, can be connected to the endoscope, even in conjunction with documentation units. To look into the endoscope with the naked eye, an appropriate adapter can be attached, by means of which the proximal interocular distance of the endoscope can be adjusted, in the usual manner, to the natural interocular distance of the user.

BRIEF DESCRIPTION OF THE DRAWINGS

The foregoing summary, as well as the following detailed description of a preferred embodiment of the invention, will be better understood when read in conjunction with the appended drawings which show further features and advantages of the invention. For the purpose of illustrating the invention, there is shown in the drawings an embodiment which is presently preferred. It should be understood, however, that the invention is not limited to the precise arrangements and instrumentalities shown. In the drawings:

FIG. 1 is a side view of an embodiment according to the invention;

FIG. 2 is a schematic representation, in enlarged scale, of the optical units of the embodiment of FIG. 1;

FIGS. 3 & 4 are items of accessory equipment for the embodiment in accordance with FIGS. 1 and 2, in side view;

DETAILED DESCRIPTION OF PREFERRED EMBODIMENT

Figure 5:
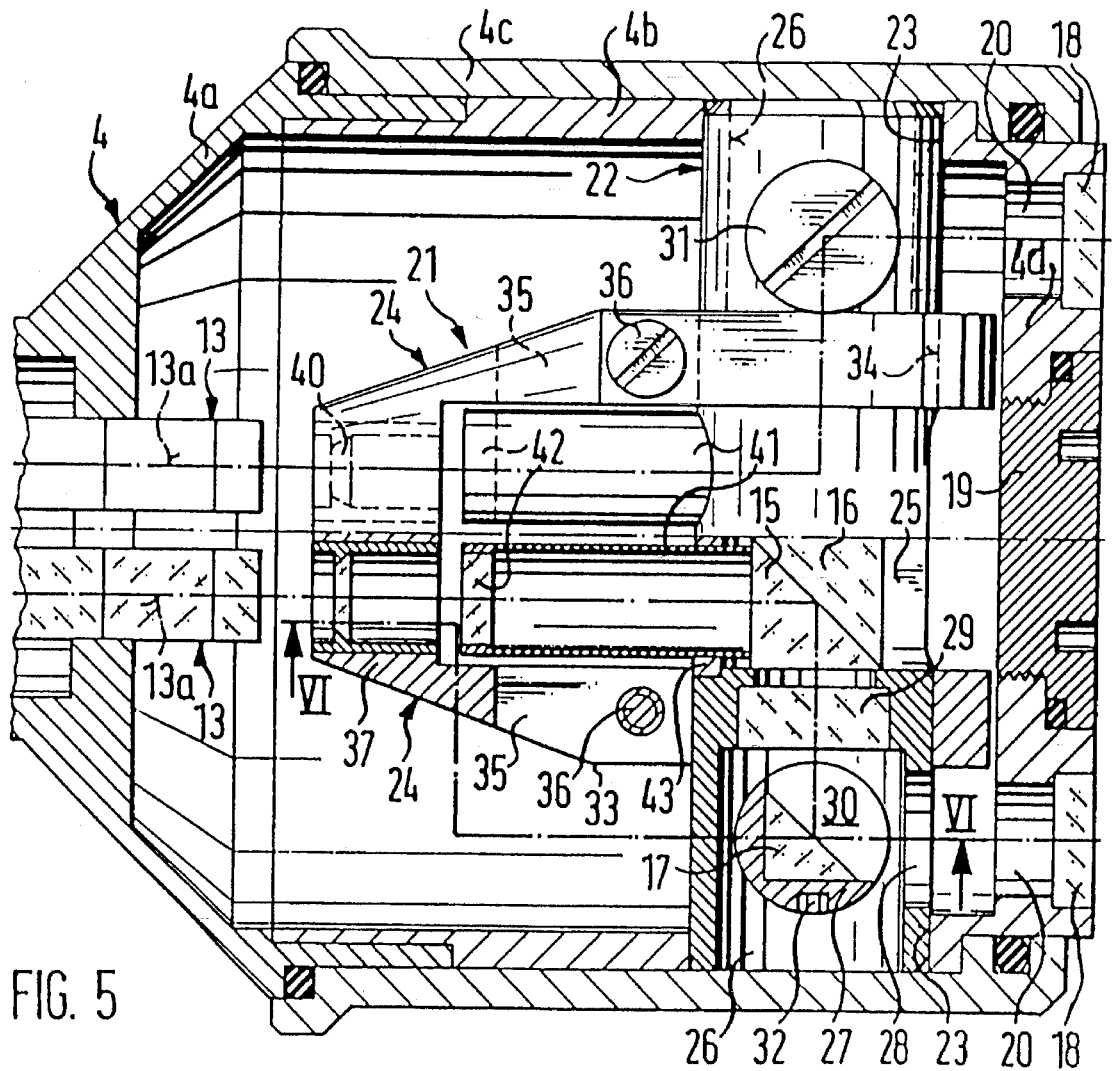
FIG. 5, shown in enlarged scale, is an essentially axial section through the proximal end section of the embodiment.

The stereo endoscope, which is generally designated with 1 in FIG. 1, has an elongated shaft 2 with distal viewing window 3 and, on the proximal end, a housing 4 with an expanded diameter, a tube connection 5, a light guide cable connection 6, and a coupling formation 7. In accordance with FIGS. 3 and 4, an eyepiece adapter 8 or a stereo endo-camera 9 can be attached to the housing 4 of the endoscope 1 by means of the corresponding coupling devices 10 and 11. The endo-camera 9 can be connected to a monitor or a documentation unit (neither is shown) in the usual manner. The coupling devices 7, 10 and 11 can be provided in the form of bayonet formations.

In FIG. 2 the optical units are shown schematically. In the shaft 2 there are found, in close proximity to one another, optical systems 13 that are configured in the usual manner. A stereo optical device 14 connects at the proximal end of both optical systems 13. This device consists, in principle, of two first deviating prisms 15, which are fastened to a common carrier 16, and of two following deviating prisms 17, each of which is likewise fastened to a carrier part, in a manner to be described below. On the viewing end, there then follow two transparent protective elements 18, which are fastened to the housing 4. While the first deviating prisms 15 are aligned along the optical axes 13a of the optical systems, the second deviating prisms 17 again bring about, in the usual manner, a parallel alignment of the deviated optical axes in the direction towards the viewing end of the endoscope.

Figure 6:
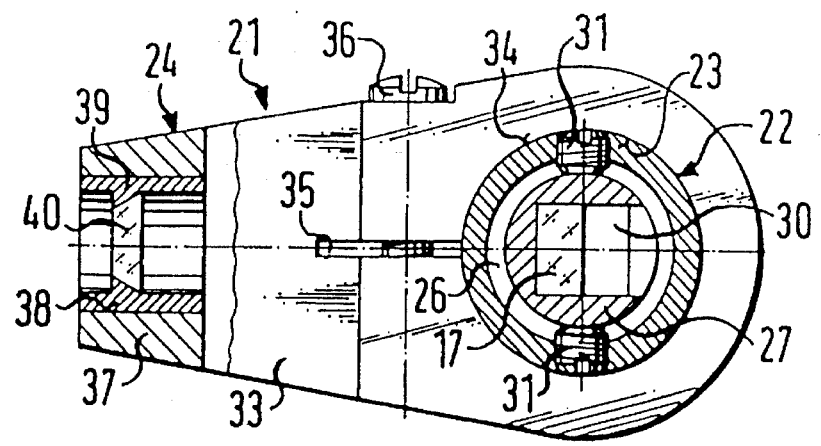
FIG. 6 is a partially sectional view of a holding assembly taken along line VI—VI in FIG. 5.

In FIGS. 5 and 6, the arrangement and fastening of the stereo optical device 14 in the housing 4 can be seen clearly. The housing 4 comprises a front part 4a, a rear part 4b that is joined to it, and a connecting part 4c that tightly surrounds both of these parts. In the proximal wall 4d of the rear housing part 4b, a central closing part 19 is screwed in. The closing part can be exchanged for a tube connection support (not shown). The wall 4d additionally exhibits two openings 20, into which the transparent protective elements 18 are placed.

In proximity to the proximal wall 4d of the housing 4, a holding assembly 21 for the stereo optical device 14, is inseparably fastened in the rear housing part 4b. This assembly comprises, in essence, a first holding part 22, which is fastened into holes 23 in the rear housing part 4b that are diametrically opposite each other, and two additional holding parts 24, which are arranged on, and can be attached to, the first holding part 22 in such a way that they can be pivoted and displaced axially, as shown in FIGS. 5 and 6.

The first holding part 22 is basically configured as a hollow cylindrical component with a central cross outlet 25, which is directed towards the optical systems 13, in accordance with FIG. 5. The carrier 16 for the first deviating prisms 15 is placed in a fixed manner in the cross outlet 25. Preferably, the carrier 16 comprises a glass block. In each of the two end regions of the hollow cylindrical component 22, a recess 26 is provided in the form of a bore that expands in steps. In the two bores 26, an additional, adjustable carrier part 27 for the two deviating prisms 17 is arranged in an adjustable fashion. In the end regions of the second holding part 22, there are additionally provided window openings 28, so that the second deviating prisms 17 are free for the view from the proximal, transparent protective elements 18.

In FIG. 5 it can also be seen that between the first deviating prisms 15 and the second deviating prisms 17, one eyepiece lens 29 each is fastened in the first holding part 22.

Each of the additional carrier parts 27 that are shown in FIGS. 5 and 6 comprises a spherical body with a recess 30 for holding the second deviating prisms 17. In the end regions of each of the first holding parts 22, there are provided two locking screws 31 (FIG. 6), which are diametrically opposite each other, and by means of which the additional carrier parts 27 can be fastened. In addition to this, the carrier parts 27 are provided with means of adjustment 32, which can be configured recessed, as is shown in FIG. 5, but which can also be configured protruding. By means of a tool that engages with the means of adjustment 32, the carrier parts 27 can be adjusted, whereby they can be locked in their correct position, by means of the locking screws 31, following the adjustment. The two second deviating prisms 17 are adjusted in this way. This adjustment is carried out before the housing part 4c is mounted.

Each of the two additional holding parts 24 of the holding assembly 21 exhibit, in accordance with FIG. 5, an L-shaped form. The longer leg 33 of the L-shaped holding part is provided with a bore 34 for holding a longitudinal segment of the first holding part 22, and with a clamping slot 35 that extends from this bore. Screws 36 are provided in the legs 33 in the region of the clamping slot 35 so that the additional holding parts 24 can be fastened to the first holding part 22 by tightening the screws 36. Each of the shorter legs 37 of the additional holding part 24, which are provided in the distal direction and which face each other, has a bore 38 into which a sleeve 39 is inserted, which can be axially aligned. The sleeves 39 are provided with an inner field aperture 40, whereby these field apertures make possible a vignette-free manner of observation.

It can be seen from FIG. 5 that the field apertures are placed between the optical systems 13 and the deviating prisms 15. It can additionally be seen in FIG. 5 that each of the additional holding parts 24 can be axially adjusted on the first holding part 22 by means of an axial displacement. It can further be seen that the holding part 24 can be rotated around the first holding part. In this way, the central axis of each of the two field apertures 40 can be adjusted independently of each other to the optical axes 13a of the optical systems 13. Since the rotatability of the additional holding parts takes place to only a very limited extent during the adjustment of the field apertures 40, one can say that adjustment of the field apertures in this regard, that is perpendicular to the plane of the drawing in FIG. 5, takes place, in practice, in the same plane as the axial adjustment of the additional holding parts, relative to the optical systems 13.

In accordance with FIG. 5, in the intermediate space between the two longer legs 33 of the L-shaped additional holding parts 24, there are provided two tubular carriers 41, each of which is equipped with a field lens 42. The field lenses are thus located in the optical path between the field apertures 40 and the first deviating prisms 15 and improve the optical observation ratios in the stereo endoscope 1. The tubular carriers 41 are firmly seated in a mount 43, which is in turn secured in the first holding part 22, and make contact with, for example, the first deviating prisms 15. By means of axial displacement of the carriers 41, the field lenses 42 can be adjusted relative to the optical systems 13, independently of the field apertures 40. After the optical alignment of both of the field lenses 42 has been carried out, the carriers 41 are nondetachably positioned in the mount 43.

If the holding assembly 21 which carries the stereo optical device 14 in its entirety is mounted in the rear housing part 4b, it is possible to adjust the field apertures 40 relative to the optical systems 13. For this purpose, the sleeve-like housing part 4c is not yet pushed over the housing part 4b, and is not yet screwed to the housing part 4a. The two deviating prisms 17, which are thus freely accessible from the outside, and the field apertures 40 can be checked and adjusted. After the adjustment has been carried out, the housing part 4c is pushed over the housing part 4b, and is screwed to the housing part 4a.

In order to be able to check the endoscope with regards to tightness of seal, a tube connection mounting can be screwed into the housing part 4d in place of the closing part 19, and in this way the entire interior space of the stereo endoscope can be connected to an overpressure source. After checking the tightness of the seal, the tube connection mounting can be removed, and the interior tightly sealed by means of the closing part 19.

In a further development of the stereo endoscope, in accordance with the invention, it is possible to place the carrier parts 27 that are located in the bore 26 in an additional cylindrical sleeve, which is not shown. By means of an axial adjustment of this sleeve in the bores 26, the distance between the two second prisms 17, and with that, the reduced interocular distance for a recording camera or something similar that is to be connected, can be very easily adjusted.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the appended claims.

We claim:

1. A stereo endoscope comprising a shaft with two optical systems extending through the shaft and arranged in close proximity to one another, a housing provided at a proximal end of the shaft, the housing including an inner holding assembly for a stereo optical device for a stereo view into the optical systems, the stereo optical device having, on each side in a duplicate, mirror-image arrangement, a first deviating prism that is aligned coaxially with its associated optical system, a second deviating prism that follows the first prism and aligns an optical axis of its associated optical system parallel to the direction of observation, and a transparent protective element in the direction of observation, the holding assembly (21) comprising a first holding part (22) having a longitudinal axis which extends transverse to the optical axes (13a) of the two optical systems (13) of the shaft (2), the first holding part having inner recesses (25, 26) in which are arranged, one each, the first deviating prism (15) in a fixed manner and the second deviating prism (17) in an adjustable manner, the holding assembly having two additional holding parts (24) rotatably fastened to the first holding part (22) in such a way that they can be adjusted around the longitudinal axis of the first holding part, the additional holding parts carrying two fixed field apertures (40) for the two optical systems (13), each of the field apertures (40) being arranged between its associated optical system (13) and the first deviating prism (15).

2. The stereo endoscope according to claim 1, wherein the first holding part (22) is configured as an essentially hollow, cylindrical component with a central cross outlet (25) aligned with both of the optical systems (13), a common, fixed carrier part (16) for both of the first deviating prisms (15) being arranged in the cross outlet, and wherein each of the inner recesses (26) arranged in end regions of the hollow, cylindrical holding part (22) has window openings (28) in the directions of observation and an adjustable carrier part (27) for the second deviating prism (17).

3. The stereo endoscope according to claim 2, wherein each of the adjustable carrier parts (27) comprises a spherical body with a recess (30) for holding the second deviating prism (17).

4. The stereo endoscope according to claim 3, wherein each of the adjustable carrier parts (27) is provided with a positive engagement means of adjustment (32), and each being adjustable by means of two locking screws (31) lying opposite each other, and being screwed into the end regions of the first holding part (22).

5. The stereo endoscope according to claim 1, wherein in the first holding part (22) of the holding assembly (21) an ocular lens (42) is arranged between each of the first and second deviating prisms (15, 17).

6. The stereo endoscope according to claim 5, wherein each of the two additional holding parts (24) of the holding assembly (21) has an L-shape form including a longer leg (33) having a bore (34) for accommodating the first holding part (22) and a clamping slot (35) extending from this bore and being alterable by means of screw force, and a shorter leg (37) on a distal end of each additional holding part (24) having a bore (39) for holding the field aperture (40).

7. The stereo endoscope according to claim 6, further comprising an intermediate space between the two longer legs (33) of the additional holding parts (24), the intermediate space containing two tubular carriers (41) being adjustable in the direction of the optical axes each carrier being equipped with a field lens (42), the field lenses (42) being located in an optical path between the field apertures (40) and the first deviating prisms (15).

8. The stereo endoscope according to claim 2, wherein in each of the end recesses (26) of the first holding part (22) is arranged an axially adjustable cylindrical carrier sleeve, the carrier sleeves holding the carrier parts (27) with the second deviating prisms (17).

* * * * *